June 5, 1956 A. J. ALLEN 2,748,600
DUAL PROTECTION GAS METER BY-PASS
Filed May 28, 1953 3 Sheets-Sheet 1

Inventor
Albert J. Allen
by Roberts, Cushman & Grover
Att'ys.

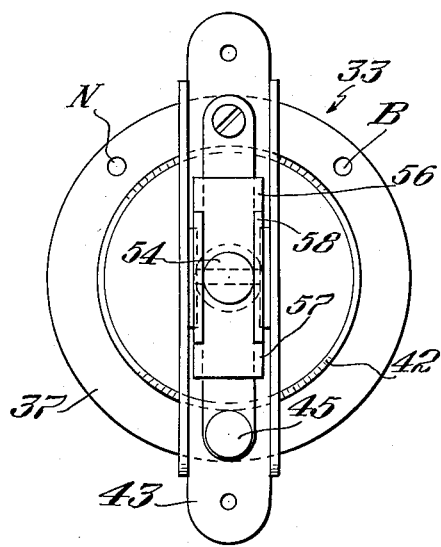
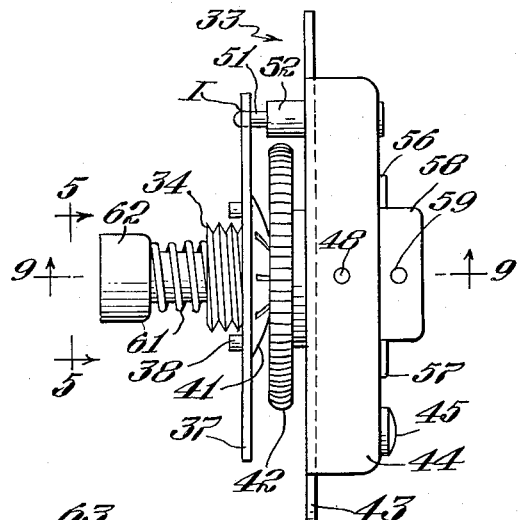
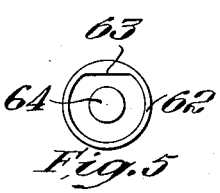
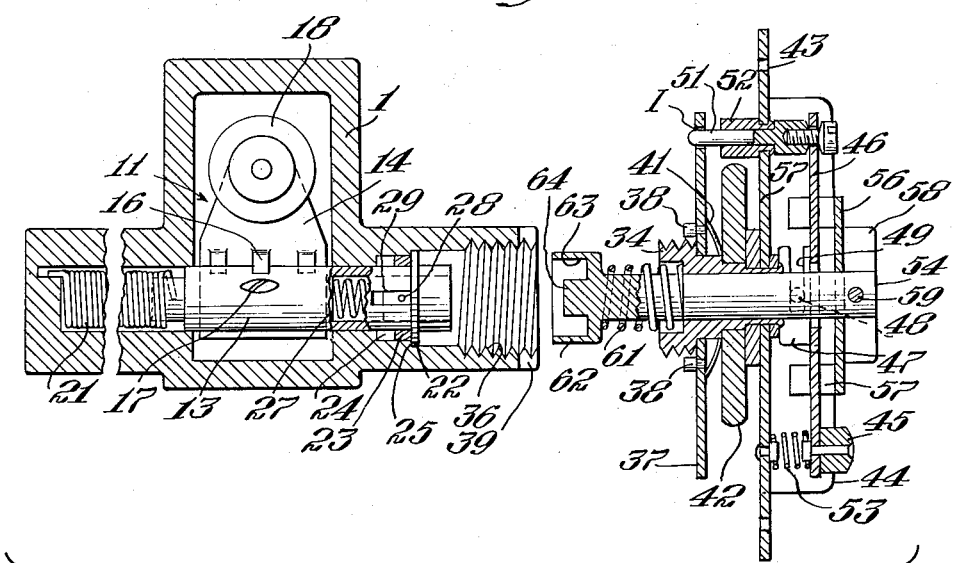
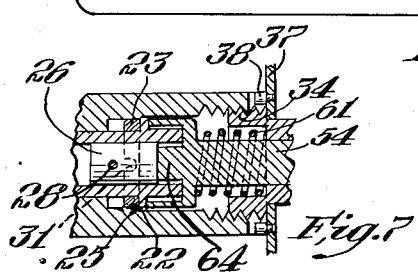

June 5, 1956            A. J. ALLEN            2,748,600

DUAL PROTECTION GAS METER BY-PASS

Filed May 28, 1953            3 Sheets-Sheet 3

Inventor
Albert J. Allen
by Roberts, Cushman & Groves
Att'ys.

United States Patent Office 2,748,600
Patented June 5, 1956

2,748,600
DUAL PROTECTION GAS METER BY-PASS

Albert J. Allen, Garden City, N. Y., assignor to Anchor Manufacturing Company, Boston, Mass., a corporation of Massachusetts Application May 28, 1953, Serial No. 358,061

6 Claims. (Cl. 73—201)

This invention relates to means for by-passing the flow of gas past a gas meter while the meter is being repaired or replaced so that the supply of gas to the customer is not interrupted.

Objects of the invention are to provide a by-pass and valve mechanism which is simple and inexpensive in construction, which does not substantially affect the supply of gas to the customer at any times, which is not difficult to lubricate, and which would be very difficult to operate except by authorized attendants who have the proper keys.

According to the present invention the meter connection comprises an inlet for supplying gas to the meter, an outlet for delivering gas from the meter, a by-pass having one end connected to the inlet and the other end connected to the outlet, valves at said ends having normal positions in which gas can flow through the meter but not through the by-pass, and by-pass positions in which gas can flow through the by-pass but not through the meter, keys for operating the valves, and means interconnecting the keys to prevent one valve from being placed in one of said positions while the other valve is in the other position, so that gas can always flow from the inlet to the outlet through the meter or through the by-pass. The means interconnecting the keys preferably comprise chains or other flexible connectors. In the preferred embodiment each key has attaching and operating parts movable independently of each other for first attaching the key to the valve casing and then operating the valve, the attaching parts of the keys having means to latch the operating parts in predetermined positions.

For the purpose of illustration a typical embodiment of the invention is shown in the accompanying drawings in which—

Figure 1:
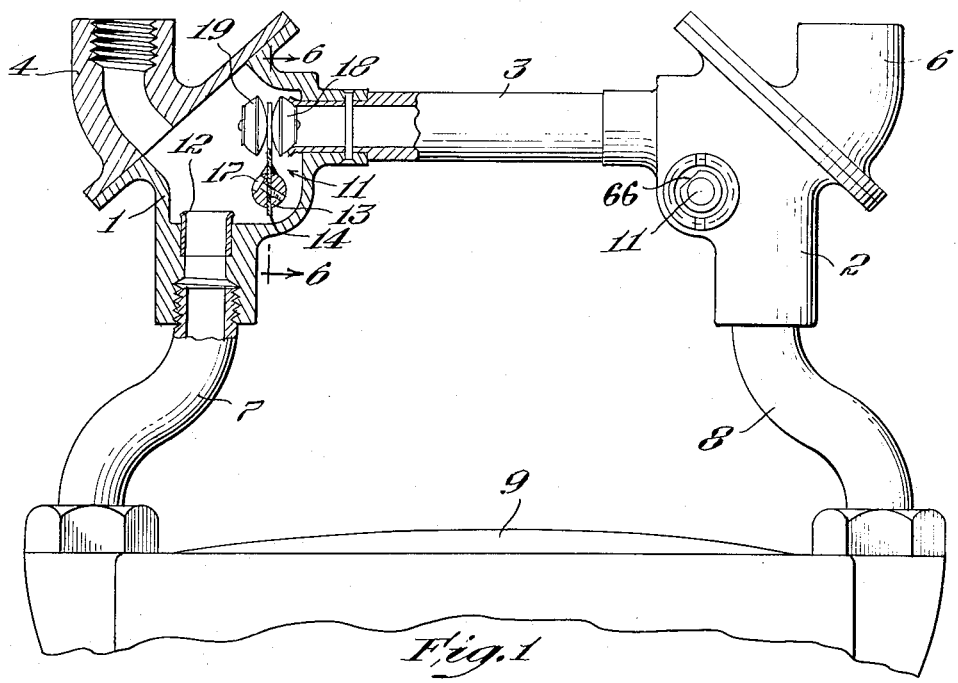
Figure 2:
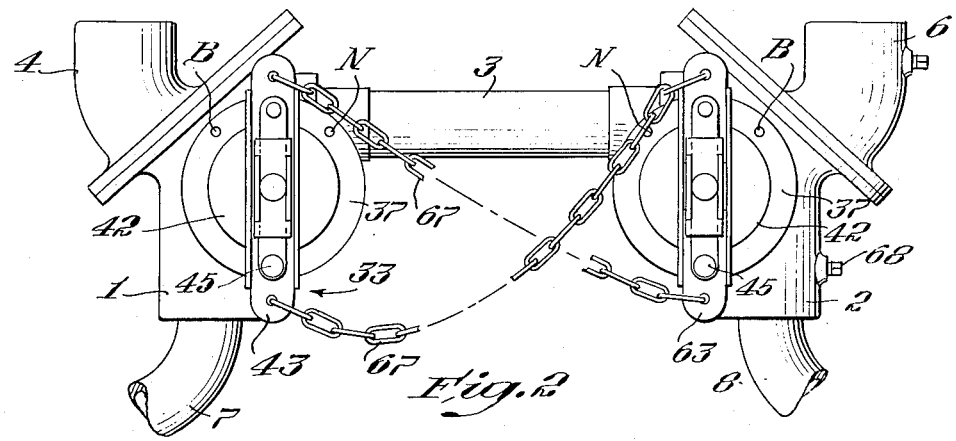
Figure 8:
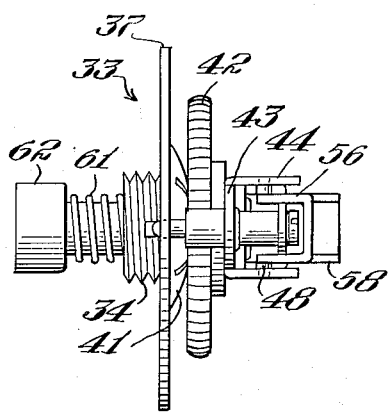
Figure 9:
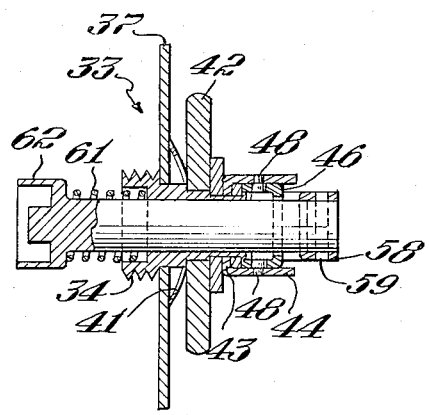
Figure 10:
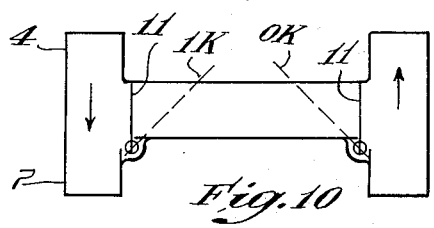

Fig. 1 is a front elevation with parts in section;
Fig. 2 is a front elevation with the keys in place;
Fig. 3 is a front elevation of one of the keys;
Fig. 4 is a side elevation of one of the keys;
Fig. 5 is a view on the line 5—5 of Fig. 4;
Fig. 6 is a longitudinal vertical section through a key and valve with the parts separated and the key in intermediate position;
Fig. 7 is a similar view after the key has been attached to the valve and with both key and valve in intermediate position;
Fig. 8 is a top plan view of the valve;
Fig. 9 is a section on line 9—9 of Fig. 4; and
Figs. 10 to 13 comprise a series of views illustrating the sequence of operation of the valves.

The particular embodiment of the invention chosen for the purpose of illustration comprises an inlet casing 1, an outlet casing 2, a by-pass 3 interconnecting the inlet and outlet, a connection 4 for connecting to a source of gas supply, a coupling 6 for connection to a customer's line, connections 7 and 8 to a meter 9 and valves 11 in the inlet and outlet casings. Each valve has a normal position such as illustrated in Fig. 1 in which gas can flow through the meter but not through the by-pass, and each has a by-pass position in which it seats on a valve seat 12 to obstruct flow through the meter and permit flow through the by-pass. The openings in the casings 1 and 2 which are presented to the couplings 4 and 6 are large to permit ready access to the valves 11 when the couplings are removed and they are so shaped that the couplings 4 and 6 may be connected either vertically as shown in Fig. 1 or horizontally with their threaded ends directed horizontally.

As shown in Fig. 6 each valve comprises a shaft 13 having a slot extending through it diametrically. Mounted in the slot is a flat arm 14 having struck-up tongues 16 to limit the extent to which the arm can be inserted into the shaft. As shown in Fig. 1 the blade is held in the shaft by means of a screw 17. Mounted on the free end of the arm 14 are two valve disks 18 and 19 of usual construction, one to seat on the end of the by-pass and the other to seat on 12. Each valve is yieldingly held in normal position by means of a torsion spring 21 which has one end anchored in the casing 1 and the other end anchored in the rear end of the valve shaft (Fig. 6).

The front end of each valve shaft has a flange 22 seating against a ring 23 fast in the front end of a recess 24 with a flange 25 seating against a shoulder on the valve casing. The front end of each valve shaft also has an axial bore in which is mounted a sliding plug 26 pressed outwardly by a compression spring 27. Extending through the plug 26 is a pin 28 having its ends extending through slots 29 in the valve shaft and thence into recesses 31 in the rear side of the ring 23. Thus the valve cannot be moved from normal position until the plug 26 is pushed inwardly against the action of the spring 27 far enough for the ends of the pin 28 to leave the recesses 31 in the ring 23 and move back into the space 24 behind the ring. The outward movement of the plug 26 in response to spring 27 is limited by engagement of the ends of the pin 28 with the outer ends of the slots 29.

Each of the operating keys 33 comprises a tubular body 34 which is threaded on its rear end to engage the threads 36 in the valve casing (Fig. 6). Mounted on the body immediately in front of the threads is a circular plate 37 which has pins 38 to fit into recesses 39 in the end of the valve casing when the body of the key is threaded into the casing. The disk 37 is free to move relatively to the body 34 and it is yieldingly pressed into its forward position shown in Figs. 4, 6 and 9 by means of a disk spring 41. Fast to the body 34 immediately in front of the spring 41 is a knurled wheel 42. Mounted on the front end of the body 34 between two washers is a cross-bar 43 having lateral flanges 44 extending forwardly at its sides, the forward end of the tubular body 34 being expanded or spun outwardly to hold the bar 43 fast to the body. Mounted between the flanges 44 of the cross-bar 43 is a latch-bar 46 which has flanges 47 turned inwardly and along the inside faces of the flanges 44. Mounted in the flanges 44 are pins 48 which extend into slots 49 in the flanges 47 so that the two bars 43 and 46 are pivotally interconnected. At its upper end the latch-bar 46 carries a latch-pin 51 slidable in a bearing 52 in the cross-bar 43. The projecting end of the pin 51 is adapted to engage in any one of three openings N, I and B in the disk 37 (Figs. 2, 4 and 6) corresponding to the normal, intermediate and by-pass positions respectively of the valve. At the bottom a compression spring 53 is interposed between the two bars to urge the bar 46 in a counter-clockwise direction about the pins 48, thereby yieldingly holding the pin 51 into one of the openings N, I and B. To retract the pin 51 the button 45 at the lower end of the bar 46 is pressed inwardly to swing the bar in a clockwise direction (Figs. 4 and 6) about the pins 48. Extending through an axial bore in the key body 34 is a shaft 54. Mounted on the forward end of the shaft 54 is a handle-bar 56 having in-turned flanges 57 at the top and bottom and out-turned flanges 58 intermediate the end of the flanges. The handle-bar is secured to the shaft by means of a pin 59 extending through the shaft and through the out-turned flanges 58.

The rear end of shaft 54 is enlarged and a spring 61 is interposed between the enlargement and the rear end of the body 34. Extending rearwardly of the periphery of the enlarged end is a flange 62 which is flattened at 63 (Fig. 5). Inside the flange is an axial projection 64. When the key is applied to the valve casing the flange 62 telescopes over the end of the valve shaft 13 and the axial projection 64 presses the plug 26 inwardly to the position shown in Fig. 7. The end of the valve shaft also has a flat surface 66 (Fig. 1), corresponding to the surface 63 of the key, so that the two shafts rotate together.

From the foregoing it will be understood that after the keys are attached the parts 34, 37 and 42 remain stationary, the parts 43, 46, 54 and 56 being rotatable relative to the stationary parts to actuate the valves. Thus the parts 34, 37 and 42 are called the attaching parts and the parts 43, 46, 54 and 56 are called the operating parts.

When the valves are in the normal positions illustrated in Fig. 1 the flat surfaces 66 are perpendicular to the radii leading to the openings N (Figs. 1 and 2). Thus the keys are not applied to the valves in the vertical position shown in Fig. 2 but in the positions indicated in Fig. 10. Thus the flat surfaces 63 of the keys should be offset from the vertical as illustrated in Fig. 5, the flat of the inlet key being offset clockwise and the offset on the outlet key being offset counter-clockwise (Figs. 1 and 2).

To attach the keys to the valve casings the wheels 42 are turned to thread the body 34 into the threaded openings 36 in the valve casings (Fig. 6). During this operation the only parts which need to rotate are the body 34 and the knurled wheel 42 which are fast together. As the key is threaded into the socket the projection 64 retracts the plug 26 to unlock the valve by moving the ends of the pin 28 out of the recesses 31 into the open space 24 and the flange 62 telescopes over the end of the valve shaft with the flat 63 on the key engaging the flat 66 on the valve shaft. As the key seats in the socket the pins 38 enter the recesses 39 to prevent rotation of the disk 37.

After the keys have been inserted the valves may be actuated by pressing the buttons 45 to retract the latch-pins 51 from the stationary latch-disk 37, whereupon the valves may be moved from normal position to by-pass position by means of the handles 58. When the operating parts of the keys are in the normal positions shown in Fig. 10 the latch-pins snap into the openings N; when these parts are in the intermediate positions shown in Figs. 2, 3, 4, 5, 6 and 11 the latch-pins snap into the openings I; and when these parts are in the by-pass positions shown in Fig. 12 the latch-pins snap into the openings B.

Figure 11:
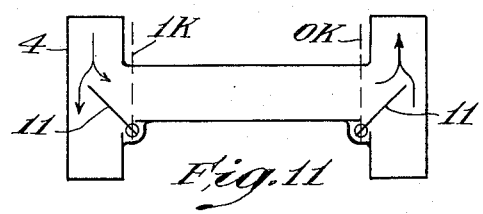
Figure 12:
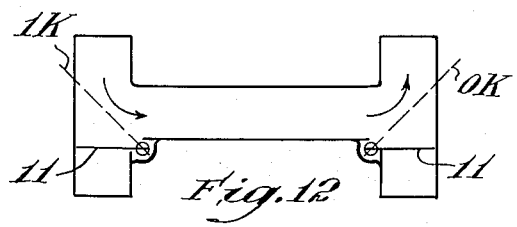
Figure 13:
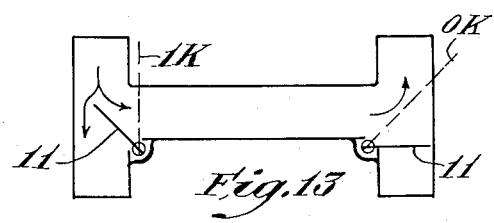

As shown in Fig. 2 the cross-bars 43 of the two keys are interconnected by chains 67 so that the valves can be operated only in predetermined sequence such that one valve cannot be in normal position while the other valve is in by-pass position, whereby the flow of gas to the customer cannot be interrupted. The sequence of operation is shown diagrammatically in Figs. 10 to 13 where the parts shown diagrammatically are designated by the same numerals as in the preceding figures, IK indicating the operating parts of the inlet key and OK indicating the operating parts of the outlet key. The keys are inserted with the operating parts closer together at the top than at the bottom as in Fig. 10, the chains permitting this relative arrangement, and with the latch-pins 51 in the normal openings N of the latch-disk 37. After the keys are applied in these relative positions they are both turned to the upright position shown in Figs. 2 and 11. When the buttons 43 are released springs 53 snap the latch-pins 51 into the intermediate openings I of the latch-disks 37 to lock the keys in these positions, wherein the valves are half way between normal and by-pass positions as indicated in Fig. 11. Then the operating parts of the keys may be moved to the positions wherein the latch-pins snap into the by-pass openings of the latch-disk 37, in which positions both valves seat on their meter-connection seats 12, as shown in Fig. 12, completely to cut off the flow of gas through the meter. In this position of the keys the meter may be removed without loss of gas and without interrupting the customer's service. After the meter has been replaced the inlet key is preferably moved to intermediate position while the outlet key is left in by-pass position, thereby to purge the new meter (Fig. 13). During this operation the plug 68 (Fig. 2) is removed to permit the escape of air from the meter. After the meter has been purged the outlet key is moved to intermediate position as shown in Fig. 11, after which both keys may be returned to the normal position shown in Fig. 10 and removed by turning the wheels 42. After the keys are removed pipe plugs should be threaded into the sockets 36.

From the foregoing it will be understood that the present invention permits the use of simple and inexpensive valves which are easy to install and easy to maintain and which present no lubrication problems. It will also be understood not only that gas flow to the customer cannot be interrupted but also that it cannot be substantially diminished, this for the reason that neither of the valves disks 18 and 19 of either valve 11 (Fig. 1) can approach either of its seats until the other valve is wide-open. By virtue of the interconnection between the keys neither valve 11 can be placed in normal or by-pass position while the other valve is in the other position; consequently the supply of gas to the customer cannot be cut off.

It should be understood that the present disclosure is for the purpose of illustration only and that this invention includes all modifications and equivalents which fall within the scope of the appended claims.

I claim:

1. A gas meter connection comprising an inlet for supplying gas to the meter, an outlet for delivering gas from the meter, a by-pass having one end connected to the inlet and the other end connected to the outlet, at said ends separately operable valves having normal positions in which gas can flow through the meter but not through the by-pass and by-pass positions in which gas can flow through the by-pass but not through the meter, keys for separately operating said valves, and means interconnecting the keys when the keys are operatively connected to the valves to prevent one valve from being placed in one of said positions while the other valve is in the other position, whereby gas can always flow from the inlet to the outlet through the meter or through the by-pass.

2. A gas meter connection comprising an inlet for supplying gas to the meter, an outlet for delivering gas from the meter, a by-pass having one end connected to the inlet and the other end connected to the outlet, at said ends separately operable valves having normal positions in which gas can flow through the meter but not through the by-pass and by-pass positions in which gas can flow through the by-pass but not through the meter, keys for separately operating said valves, and means interconnecting the keys for sequential operation when the keys are operatively connected to the valves, said means including flexible connectors to prevent one valve from being placed in one of said positions while the other valve is in the other position, whereby gas can always flow from the inlet to the outlet through the meter or through the by-pass.

3. A gas meter connection comprising an inlet for supplying gas to the meter, an outlet for delivering gas from the meter, said inlet and outlet each including a valve casing, a by-pass having one end connected to the inlet and the other end connected to the outlet, at said ends separately operable valves having normal positions in which gas can flow through the meter but not through the by-pass and by-pass positions in which gas can flow through the by-pass but not through the meter, keys for separately operating said valves, each key having attaching and operating parts movable independently of each other for first attaching the key to the valve casing and then operating the valve, and means interconnecting the operating parts of the keys when the keys are operatively connected to the valves to prevent one valve from being placed in one of said positions while the other valve is in the other position, whereby gas can always flow from the inlet to the outlet through the meter or through the by-pass.

4. A gas meter connection comprising a valve casing having an inlet for supplying gas to the meter, an outlet for delivering gas from the meter, a by-pass having one end connected to the inlet and the other end connected to the outlet, at said ends separately operable valves having normal positions in which gas can flow through the meter but not through the by-pass and by-pass positions in which gas can flow through the by-pass but not through the meter, keys for separately operating said valves, each key including attaching and operating parts movable independently of each other for first attaching the key to the valve casing and then operating the valve, the attaching parts of the keys including means to latch the operating parts in predetermined positions, and means interconnecting the operating parts of the keys when the keys are operatively connected to the valves to prevent one valve from being placed in one of said positions while the other valve is in the other position, whereby gas can always flow from the inlet to the outlet through the meter or through the by-pass.

5. A gas meter connection comprising an inlet for supplying gas to the meter, an outlet for delivering gas from the meter, a by-pass having one end connected to the inlet and the other end connected to the outlet, at said ends separately operable valves having normal positions in which gas can flow through the meter but not through the by-pass and by-pass positions in which gas can flow through the by-pass but not through the meter, keys for separately operating said valves, means urging the valves toward normal position for automatically returning the valves to normal position when the keys are removed, and means interconnecting the keys when the keys are operatively connected to the valves to prevent one valve from being placed in one of said positions while the other valve is in the other position.

6. A gas meter connection comprising an inlet for supplying gas to the meter, an outlet for delivering gas from the meter, a by-pass having one end connected to the inlet and the other end connected to the outlet, at said ends separately operable valves having normal positions in which gas can flow through the meter but not through the by-pass and by-pass positions in which gas can flow through the by-pass but not through the meter, keys for separately operating said valves, means urging the valves toward normal position for automatically returning the valves to normal position when the keys are removed, means for latching the valves in normal position, and means for unlatching the valves in response to insertion of the keys, and means interconnecting the keys when the keys are operatively connected to the valves to prevent one valve from being placed in one of said positions while the other valve is in the other position.

References Cited in the file of this patent

UNITED STATES PATENTS

| | | |
|---|---|---|
| 675,327 | Felt | May 28, 1901 |
| 1,937,597 | Schmidt | Dec. 5, 1933 |
| 2,249,090 | Rabinowicz | July 15, 1941 |
| 2,579,656 | Douglas et al. | Dec. 25, 1951 |
| 2,632,328 | McChesney | Mar. 24, 1953 |